(12) United States Patent
Krüger

(10) Patent No.: US 7,082,195 B1
(45) Date of Patent: Jul. 25, 2006

(54) BUS SYSTEM FOR TRANSMITTING OPTICAL SIGNALS

(75) Inventor: Werner Krüger, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,398

(22) PCT Filed: Sep. 17, 1999

(86) PCT No.: PCT/DE99/02995

§ 371 (c)(1),
(2), (4) Date: Mar. 16, 2001

(87) PCT Pub. No.: WO00/17687

PCT Pub. Date: Mar. 30, 2000

(30) Foreign Application Priority Data

Sep. 18, 1998 (DE) ................................ 198 42 815

(51) Int. Cl.
*H04M 9/00* (2006.01)

(52) U.S. Cl. ........................... 379/433.07; 379/433.04; 379/430; 379/438

(58) Field of Classification Search ............ 455/575.3, 455/550.1, 557.1, 59.1, 90.1, 41.1, 41.2, 455/552.1, 556.1, 560.1, 560.2, 575.6; 398/134, 398/164, 106, 114–117, 172; 310/330; 379/433.07, 379/433.04, 430, 438
See application file for complete search history.

(56) References Cited

U.S. PATENT DOCUMENTS

| 4,575,180 A | 3/1986 | Chang ........................ 385/47 |
| 5,193,132 A | 3/1993 | Uken et al. .................. 385/32 |
| 5,237,607 A | 8/1993 | Diamantis ................... 379/419 |
| 5,854,984 A * | 12/1998 | Buhrmann et al. ...... 455/552.1 |
| 6,259,188 B1 * | 7/2001 | Woodard et al. ............ 310/330 |

FOREIGN PATENT DOCUMENTS

| EP | 0 237 237 | 9/1987 |
| EP | 0 249 746 | 12/1987 |
| EP | 0 266 934 | 5/1988 |
| EP | 0 366 974 | 5/1990 |
| WO | WO 97/41700 | 11/1997 |

\* cited by examiner

*Primary Examiner*—Ahmad F. Matar
*Assistant Examiner*—Quynh H. Nguyen
(74) *Attorney, Agent, or Firm*—Bell, Boyd & Lloyd LLC

(57) ABSTRACT

A telephone device for transmission of optical signals comprising two optically conductive bodies movably layered and flexibly arranged on top of one another as to form a bus system, such that an optical signal input at one interface can be coupled at any other interface regardless of the position thereof. Accordingly, a faultless transmission of optical signals is assured to a great extent. Furthermore, since components of a telephone set using this flexible bus systems are no loner in electrical contact, the wear problems associated with electrical contacts are eliminated.

16 Claims, 4 Drawing Sheets

BUS SYSTEM FOR TRANSMITTING OPTICAL SIGNALS

BACKGROUND OF THE INVENTION

1. Field of the Invention

The present invention relates to a radio/telephone system for transmission of optical signals via two optically conductive bodies that form a bus system.

2. Description of the Related Art

Optical bus systems serve for the communication between opto-electronic assemblies and are traditionally formed of a bundle of light guides or optical fibers arranged parallel to one another. The input and/or output of the optical signals to be transmitted or received by the assemblies thereby ensues at an interface formed at the start or end of the bundle of light guides. In the normal case, a bundle of light guides produces the connection between two assemblies that are respectively arranged at the ends of the bundle of light guides. When, however, a plurality of assemblies are to be arranged at an end of the bundle, the bundle must be split into a corresponding plurality of sub-bundles at the end. The splitting of the bundle of light guides into a specific plurality of sub-bundles represents a complicated procedure. Since the individual light guides or optical fibers are insulated from one another—(i.e. a signal transmission does not ensue from one light guide onto another)—it is necessary to position the assemblies exactly at the respective ends of the bundle or sub-bundle of light guides. Otherwise, a correct transmission of signal between the assemblies is not assured.

EP 0 249 746 merely discloses a single optical fiber for a data bus system that, on the basis of a light-dispersing lead proceeding coaxially in its inside, enables the input or output of light through its cladding layer at various locations of its longitudinal extent.

With the mounting arrangement of EP 0 237 237, a single optical conductor at a mounting plate can be brought such into a specific position that it can be coupled to a plurality printed circuit boards attached thereto for different configurations and thereby remains easily accessible for another printed circuit board arrangement, (for example by replacement or repositioning). For the respective, given printed circuit board arrangement, the optical conductor is thereby permanently arranged in one and the same position.

EP 0 266 934 merely discloses a manufacturing method for a light waveguide with a specific structure and preparation.

EP 0 366 974 A1 is merely directed to a semiconductor circuit wherein at least two optical connecting layers are optically coupled to at least one light waveguide via an optical printed circuit board. The at least two connecting layers and the light waveguides of the optical printed circuit board are thereby arranged in a permanently given, i.e. fixed spatial allocation and are permanently optically coupled to one another in this one given position.

SUMMARY OF THE INVENTION

The invention is based on the object of offering a telephone set, telephone receiver or a mobile radiotelephone device assemblies such that an optimally faultless transmission of optical signals is enabled between them.

The optical bodies of the bus system are arranged above one another or layered on top of one another such that they are movable relative to one another and thereby simultaneously remain in optical contact with one another, so that a largely faultless transmission of optical signals is always assured between the two components of the telephone set, telephone receiver or mobile radiotelephone device. In particular, both in the off and standby condition as well as in the on condition. Since the two components are coupled to the optically conductive bodies of the bus system that are movable relative to one another, it is not necessary to electrically connect them to one another, (for example with a flexible printed circuit board). Due to the superimposed arrangement or superimposed layering of the optical bodies, these can shift relative to one another often. Wear problems that could occur, for example, given an electrical connection of the two components with a flexible printed circuit board are thus largely avoided. Thus, the risk of degradations or even interruptions of the signal transmission between the two components can be largely avoided. Accordingly, a faultless transmission of optical signals, particularly of data and/or energy, between the components two—(for example, of a mobile radiotelephone device)—can be permanently achieved to a great extent.

Furthermore, a bus system is offered for the transmission of optical signals that comprises at least one optical conductive body. Optical signals of electrical assemblies are supplied to or taken from the body via predetermined interfaces. The structure of the optically conductive body is of such a nature that an optical signal input at an interface can be coupled out at any other interface regardless of its position. The delivery of the optical signals by the electrical assemblies can thereby ensue, via light-emitting diodes, laser diodes, etc., whereas the taking thereof can ensue, with photodiodes, solar cells and phototransistors or other opto-electronic components.

The bus system can, in particular, be fashioned as a plastic body when the optically conductive body is manufactured of a shapable material. Therefore, a plurality of interfaces for the input and/or output of optical signals in the inside of the optically conductive body can also be formed after fabrication of the optically conductive body by merely pressing corresponding components into the optical conductive body. In comparison, when the optically conductive body is formed of a non-shapable material, then a bus system having a fixed shape is created that advantageously has adequate resistance to mechanical stressing.

Further, transmission losses within the bus system can be minimized in that the respective optically conductive body is expediently formed of a material that conducts light in a directed fashion.

Advantageously, even low-energy signals can thus be transmitted. When, according to another development, in contrast, the optically conductive body is manufactured of a material that conducts light in undirected fashion, then the interfaces via which optical signals are supplied to or taken from the bus system can be arbitrarily selected.

The optically conductive body can, further, be preferably formed of a material that particularly conducts light in the infrared range, in the visible range or in the ultraviolet range. Suitable materials are, in particular, plastics such as plexiglass, PVC, acrylic, as well as glass and light-transmissive liquids.

Interfaces for the input and/or output of optical signals can, for example, be particularly formed in a simple way in that the photoelements of the respective assemblies are either arranged in the inside of the optically conductive body and surrounded by it or the exterior surface of the optically conductive body—(to which the photoelements are attached)—is suitably prepared for and admission or output of light, for example by forming a surface structure that allows a partial input and/or output of light.

The optical contact between two optically conductive bodies can, in particular, be produced in a simple way in that the bodies are layered on one another or arranged on top of one another such that surface regions of the bodies overlap. The surface regions—which are in turn suitably prepared for an entry or exit of light—can thereby either touch one another or reside opposite one another at a distance to be defined. Since there is no fixed connection between the bodies, they can be shifted or, respectively, turned relative to one another.

When, according to another development, the two components are respectively arranged within an optically conductive body, a compact electrical device is created with contours that can be arbitrarily designed.

The inventive bus system can be advantageously employed in an electrical apparatus wherein the first component comprises a signal input device and the second component comprises a signal output device. For example, a telephone set, particularly a cell phone, or a telephone receiver can be formed, whereby the first component contains a keyboard and a microphone and is arranged in the first optically conductive body, and the second component contains a display and an earphone and is arranged in the second optically conductive body.

Further, an arbitrary plurality of further conductive bodies can be coupled to the inventive bus system, whereby each of the optically conductive bodies can comprise one or more light-emitting and/or light-receiving elements. Accordingly, arbitrarily large or high-performance bus system can thus be produced.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION OF THE PREFERRED EMBODIMENT

According to the embodiment, the bus system is utilized in conjunction with a mobile wireless communication system, for example a mobile radiotelephone device according to the GSM standard.

The bus system is thereby formed by, for example, two bodies having a cuboid shape (FIG. 2) that are cast from an optically conductive material such as acrylic and form the lower shell 100 and upper shell 200, i.e the housing, of the mobile radiotelephone device. In particular, a material is selected that is selectively transparent for infrared light and that conducts light in undirected fashion.

Figure 4:
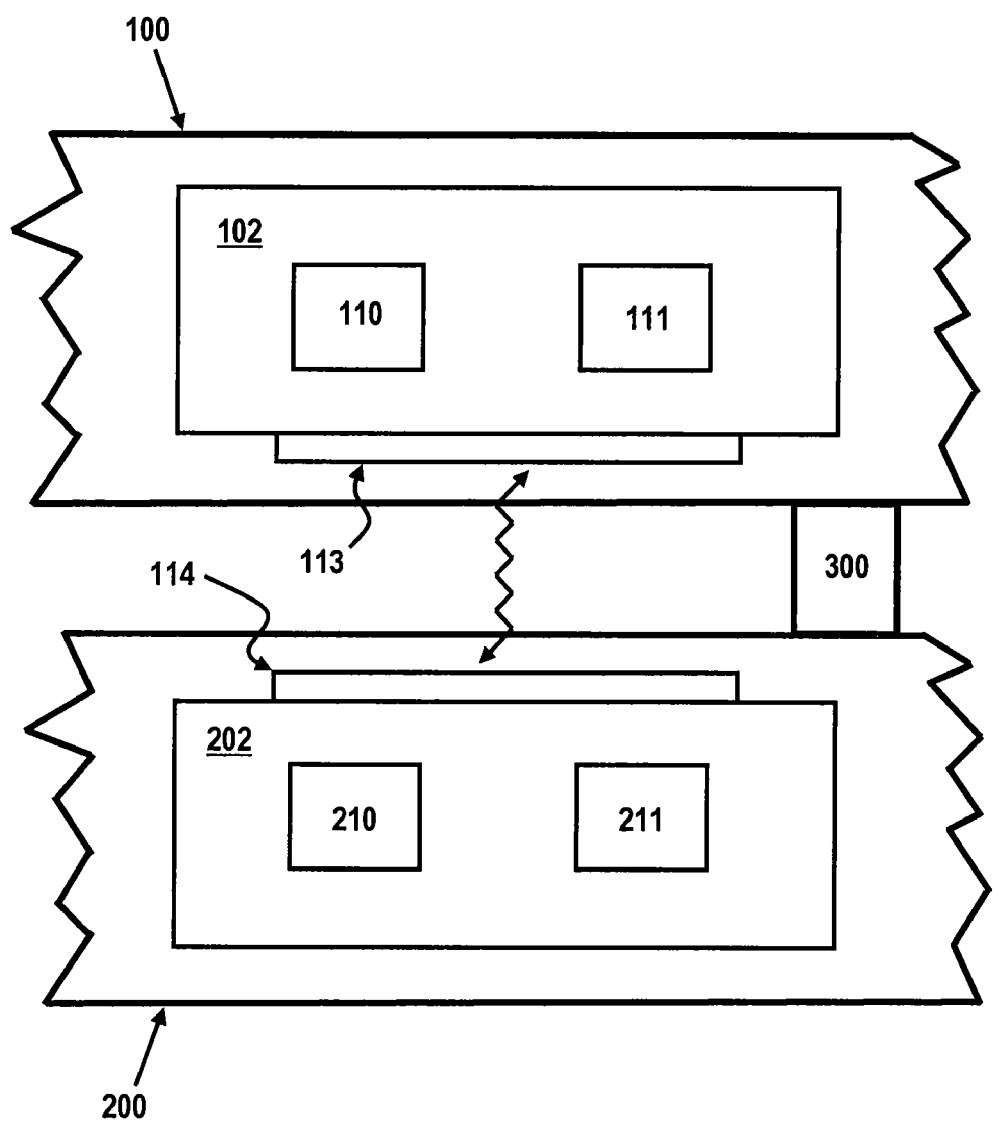
FIG. 4 illustrates optical coupling of the upper and lower shell under the exemplary embodiment.

A first component is cast into the upper shell 200, this first component comprising, among other things, a first energy store 203 to be supplied via the bus 150, a keyboard 204, a microphone 205, a first control circuit 201 and—as opto-electronic components 202 (coupling elements)—a light-emitting diode as well as a photodiode (illustrated in FIG. 4).

Compared thereto, a second component is cast into the lower shell 100 and comprises, among other things, an energy store 103 to be supplied from the outside, a liquid crystal display 104, an earphone 105, a second control circuit 101 and—again as opto-electronic components 102—a light-emitting diode as well as a photodiode (illustrated in FIG. 4). The components of the first and second component (102, 202) are electrically connected to one another in a suitable way, whereas the opto-electronic components are respectively in optical contact with the upper shell or lower shell. The respective components can be arbitrarily arranged within the upper shell and lower shell.

Figure 1:
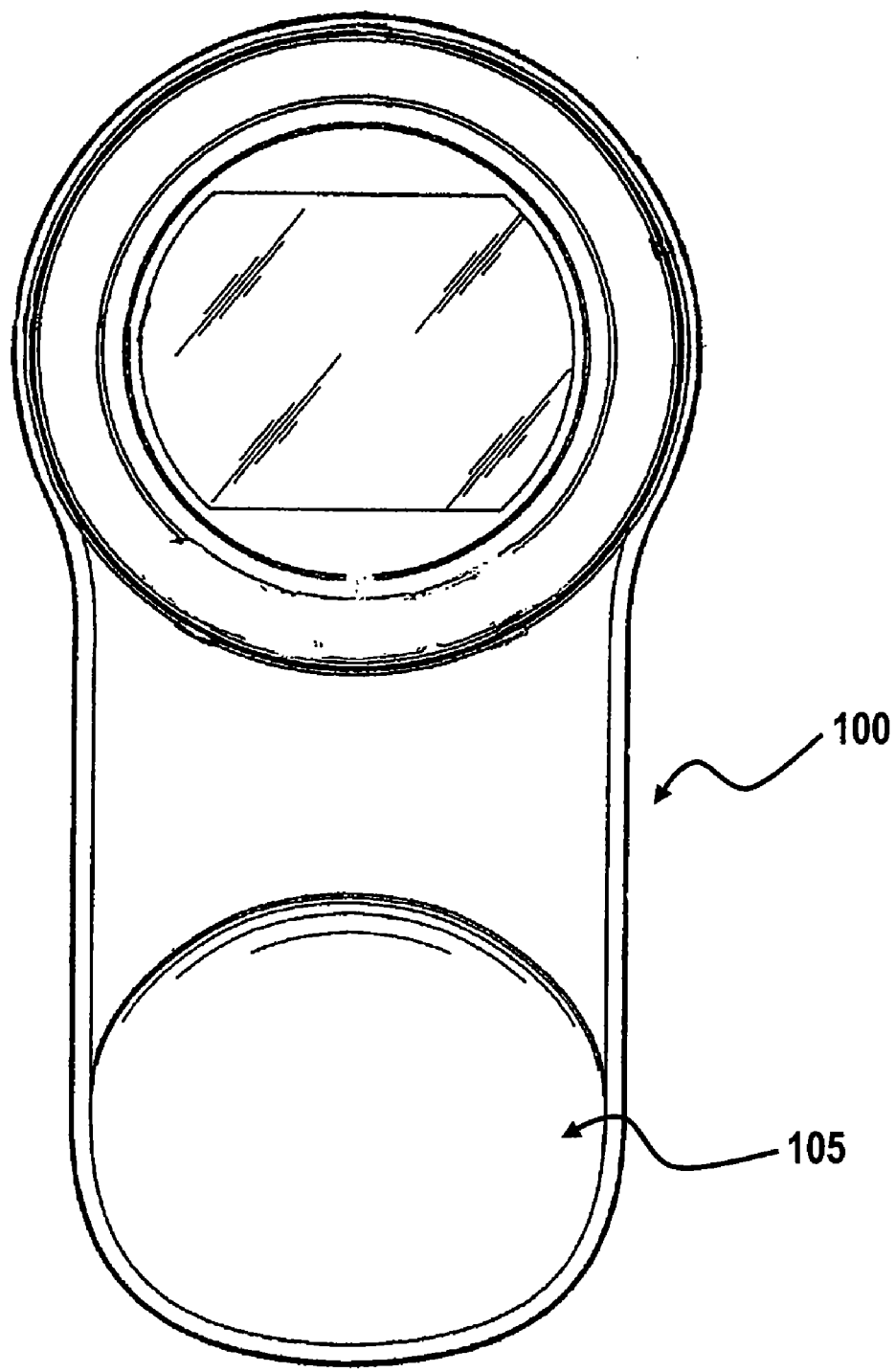
FIG. 1 illustrates a lower shell of a closed mobile radiotelephone device under an exemplary embodiment.
Figure 2:
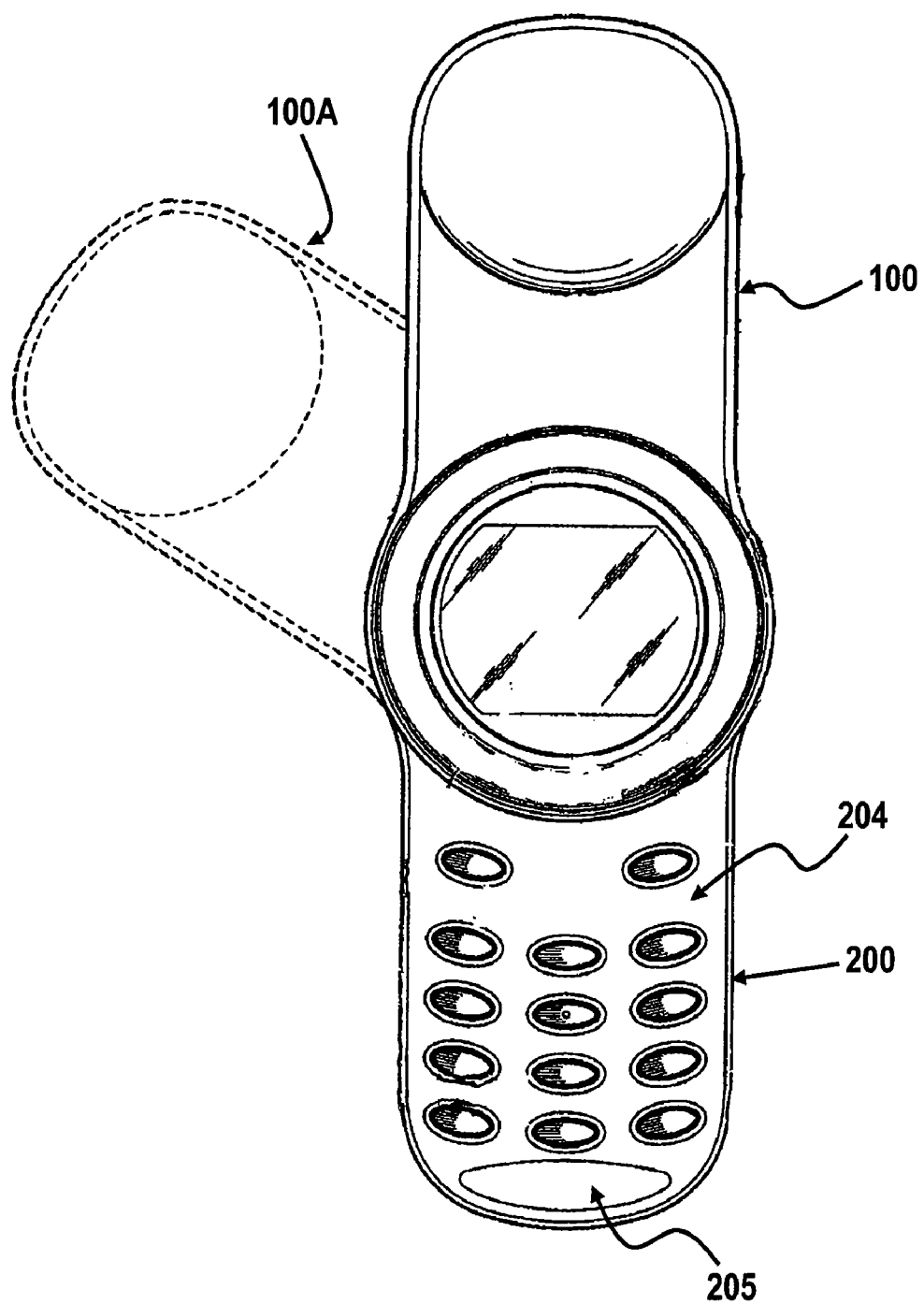
FIG. 2 illustrates the upper and lower shell of the mobile radiotelephone device in an open position under the exemplary embodiment.
Figure 3:
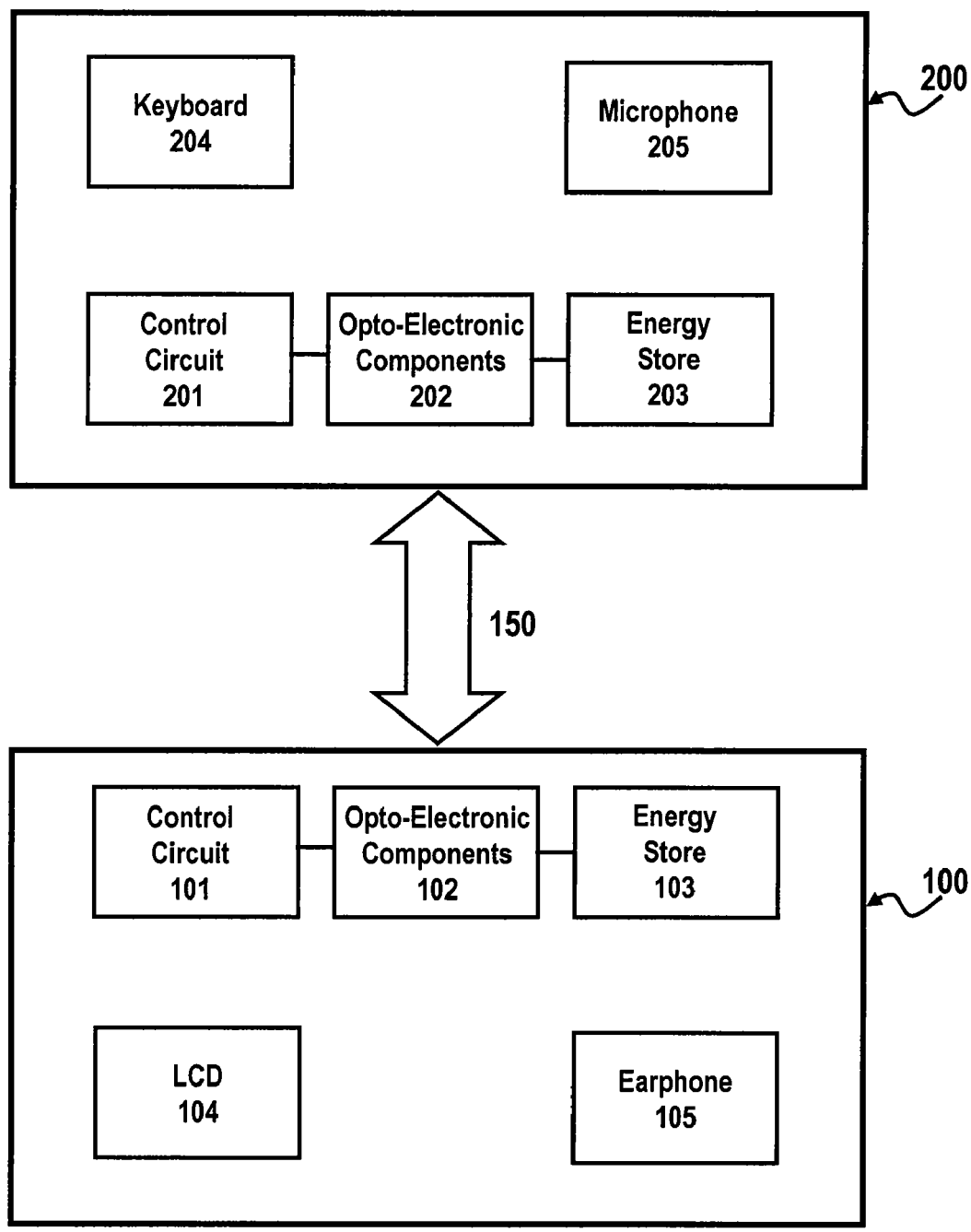
FIG. 3 is a schematic illustration of the upper and lower shell under the exemplary embodiment.

The upper and lower shell of the mobile radiotelephone device are directly layered on one another as shown in FIG. 2, whereby the sides lying opposite one another are matched to one another and are merely connected to one another by a guide device 300 that allows a relative displacement (100A) of the lower shell with respect to the upper shell. In the off condition as well as in the standby condition of the mobile radiotelephone device, the sides of the upper and lower shell lying directly opposite one another overlap completely (FIG. 1), whereas they partially overlap in the on condition (FIG. 2). In both the off condition and in the standby condition as well as in the on condition, the upper shell and lower shell are in optical contact with one another. As such, the optical contact is also maintained in the on condition, wherein the sides of the upper and lower shell lying directly opposite one another only partially overlap, the overlapping regions are fashioned such by formation of a suitable surface structure, for example by polishing, that light from the upper shell can proceed merely unimpeded into the lower shell and vice versa.

The transmission of signals between the respective components via the bus system ensues in that the first component converts electrical signals into optical signals with an opto-electronic component, the optical signals being supplied via an interface 113 to a first optical conductive body 102 of the bus system. The first optically conductive system transmits the optical signals onto a second optically conductive body 202 that is in optical contact with the first body. A second component 202 takes or receives the optical signals via an interface 114 of the second optically conductive body with another optoelectronic component 210 that converts the optical signals into electrical signals. A bidirectional transmission of signals is enabled in that the respective components are equipped both with an opto-electronic component that is suitable for the conversion of electrical signals into optical signals, such as a light-emitting diode (110, 211), as well as with an opto-electronic component that is suitable for converting optical signals into electrical signals, such as a photodiode (111, 210). Since the upper shell 100 and lower shell 200 are not electrically connected to one another, for example by a flexible printed circuit board, they can be moved arbitrarily often relative to one another without there being any risk of damaging the electrical connection.

The type of relative movement of the upper shell 100 and lower shell 200 relative to one another, i.e. a displacement, turning or hinging of the upper and lower shell relative to one another is thereby defined by the design of the guide device.

The optical signals transmitted by the bus system can, on the one hand, represent data, i.e. information. On the other hand, the optical signal can also represent energy that is needed by the respective component for offering an operating current or an operating voltage that is not supplied from the outside via an electrical conductor.

For components having very low power consumption, the energy supply via the bus system can, for example, ensue via a solar cell that converts a part of the energy situated in the bus system due to the transmitted optical signals into an operating current. In particular, the energy supply of an LCD can ensue in this way, the power requirements thereof only amounting to a few micro-amperes.

Specific circuit measures are required given components with a higher power consumption. Given, for example, a packet-oriented transmission of data, an energy store such as a capacitor, a coil, etc., can be charged with energy via the bus system. The effective data transmission rate is then defined, among other things, by the amount of energy available for the transmission of the individual data packets. The operation of a keyboard can ensue in this way.

The energy supply of acoustic components such as a microphone or an earphone requires a relatively high power consumption that is offered by a high-capacity energy store such as, for example, an accumulator or a high-capacity capacitor, for example a "gold cap".

In this embodiment, the energy supply of the mobile radiotelephone device overall and of the second component located in the lower shell ensues with the second energy store, which is fashioned as accumulator and is supplied or charged from the outside via a supply line. The energy supply of the first component situated in the upper shell, which comprises a microphone and thus has a relatively high power consumption, ensues with the first energy store, which is likewise fashioned as an accumulator or a high-capacity capacitor, for example a "gold cap", but is supplied or charged via the bus system. Alternatively, the energy supply of the first component can ensue via an electrical line that is connected to the externally supplied energy store of the second component.

For protection against mechanical damage and for shielding external noise influences, the outsides of the upper shell and lower shell of the mobile radiotelephone device are provided with a light-impermeable coating.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A telephone device for transmission of optical signals, comprising:
   a first component;
   a first body that includes at least one of a light emitting element and a light receiving element, a first plurality of interfaces for at least one of an input and an output of signals, the first body being optically conductive, the first component being arranged within the first body;
   a second component; and
   a second body that includes at least one of a light emitting element and a light receiving element, a second plurality of interfaces for at least one of an input and an output of signals, the second body being optically conductive, the second component being arranged within the second body;
   wherein the first body and the second body are arranged on top of one another as to form an optically conductive bus system, the first body and the second body being movable relative to one another and in optical contact with one another; and
   wherein the first body has an optical conductivity and the second body has an optical conductivity such that an optical signal input at any one of the first plurality and the second plurality of interfaces is coupled at another one of the first plurality and the second plurality of interfaces, regardless of a position of an interface.

2. A telephone device according to claim 1, wherein the first component is provided in an upper shell and the second component is provided in a lower shell.

3. A telephone device according to claim 2, wherein the upper shell and the lower shell are connected only via a guide device, the guide device permits a relative motion of the lower shell with respect to the upper shell.

4. A telephone device according to claim 3, wherein the guide device is fashioned as to enable at least one of a displacement and a turning and a hinging of the upper and the lower shell relative to one another.

5. A telephone device according to claim 1, wherein the bus system is formed of the first body and the second body, each of the first body and the second body having a cuboid shape, the first body and the second body being cast from an optically conductive material, the first body and the second body forming a lower shell and an upper shell.

6. A telephone device according to claim 1, wherein the first component includes a keyboard and a microphone.

7. A telephone device according to claim 1, wherein the second component includes a display and an earphone.

8. A telephone device according to claim 1, wherein the first body and the second body are at least one of movably layered as to one another and arranged on top of one another wherein:
   (a) the first body and the second body completely overlap provided that one of an off condition and a stand by condition is set, and;
   (b) the first body and the second body do not completely overlap provided that an on condition is set.

9. A telephone device according to claim 1, wherein the first component includes a signal input device and the second component includes a signal output device.

10. Telephone device according to claim 1, wherein further optically conductive bodies are coupled to the bus system, the conductive bodies including at least one of a light-emitting element and a light-receiving element.

11. A telephone device according to claim 1, wherein interfaces of the bus system for at least one of an input signals output signals are situated in one of an inside and an exterior of the first body and the second body.

12. A telephone device according to claim 1, wherein the first body and the second body are formed of a material that conducts light in at least one of an infrared range and a visible range and an ultraviolet range.

13. A telephone device according to claim 1, wherein a respective component is equipped with an opto-electronic component that converts electrical signals into optical signals and an opto-electronic component that converts optical signals into electrical signals.

14. A telephone device according to claim 1, wherein energy and data are transmitted as optical signals via the bus system.

15. A telephone device according to claim 1, further comprising:
   a solar cell for an energy supply of the first component and the second component with an assistance of the bus system, the solar cell converting a part of energy situated in the bus system as a result of a transmitted optical signal into an operating current.

16. A telephone device according to claim 1, wherein the telephone device is at least one of a telephone set and a telephone receiver and a mobile radio-telephone device.

* * * * *